US012810084B2

(12) United States Patent
Tang et al.

(10) Patent No.: US 12,810,084 B2
(45) Date of Patent: Nov. 24, 2026

(54) BLUETOOTH HEADSET-BASED VOICE TRANSLATION SYSTEM AND METHOD

(71) Applicant: SHENZHEN TIMEKETTLE TECHNOLOGIES CO., LTD, Shenzhen (CN)

(72) Inventors: Zhenhui Tang, Shenzhen (CN); Wei Shi, Shenzhen (CN); Qin Shi, Shenzhen (CN)

(73) Assignee: SHENZHEN TIMEKETTLE TECHNOLOGIES CO., LTD, Shenzhen (CN)

( * ) Notice: Subject to any disclaimer, the term of this patent is extended or adjusted under 35 U.S.C. 154(b) by 140 days.

(21) Appl. No.: 18/888,120

(22) Filed: Sep. 17, 2024

(65) Prior Publication Data

US 2025/0077803 A1 Mar. 6, 2025

Related U.S. Application Data

(63) Continuation of application No. PCT/CN2023/115929, filed on Aug. 30, 2023.

(51) Int. Cl.
*G06F 40/58* (2020.01)
*G10L 21/034* (2013.01)
(Continued)

(52) U.S. Cl.
CPC ............ *G06F 40/58* (2020.01); *G10L 21/034* (2013.01); *G10L 25/06* (2013.01); *G10L 25/18* (2013.01)

(58) Field of Classification Search
CPC ....... G06F 40/58; G10L 21/034; G10L 25/06; G10L 25/18; G10L 15/00;
(Continued)

(56) References Cited

U.S. PATENT DOCUMENTS 10,558,763 B2 * 2/2020 Choi ....................... G10L 25/93
2012/0330645 A1 * 12/2012 Belisle ................ H04M 1/6066 704/3
(Continued)

*Primary Examiner* — Stella L. Woo
(74) *Attorney, Agent, or Firm* — Law Offices of Sandy Lipkin; Sandy Lipkin

(57) ABSTRACT

The present invention provides a bluetooth headset-based voice translation system including: a first translation bluetooth headset, a second translation bluetooth headset, an audio signal processing center and a translation module. The audio signal processing center includes a Fourier-transform module, a signal cross-correlation processing module, a judgment module and a gain module. Time-frequency signal processing and signal cross-correlation processing are respectively performed on first and second audio signals respectively collected by the first and second translation Bluetooth headsets, thereby determining a sound source position and performing gain processing on the first and second audio signals. Finally, the translation module performs recognition and translation. The present invention further provides a bluetooth headset-based voice translation method. The voice translation system of the present invention solves confusion of recognition and translation, thereby making communication more effective; meanwhile, unnecessary voice recognition and translation are greatly reduced.

12 Claims, 3 Drawing Sheets

(51) Int. Cl.
*G10L 25/06* (2013.01)
*G10L 25/18* (2013.01)

(58) Field of Classification Search
CPC ........... G10L 2021/02165; G10L 15/22; G10L 15/005; G10L 15/30; H04R 2420/07; H04R 1/1016; H04R 3/02; H04R 3/12
See application file for complete search history.

(56) References Cited

U.S. PATENT DOCUMENTS

| | | | | |
|---|---|---|---|---|
| 2021/0337338 | A1* | 10/2021 | Vilkamo | H04S 7/302 |
| 2021/0377642 | A1* | 12/2021 | Luo | G06F 3/165 |

* cited by examiner

BLUETOOTH HEADSET-BASED VOICE TRANSLATION SYSTEM AND METHOD

CROSS-REFERENCE TO RELATED APPLICATIONS

This application is a Bypass Continuation application of PCT International Application No. PCT/CN2023/115929 filed on Aug. 30, 2023, the entire contents of which are incorporated herein by reference.

FIELD OF THE DISCLOSURE

The invention relates to the field of voice translation, specifically to a bluetooth headset-based voice translation system and method.

BACKGROUND

With globalization of economy, exchanges between countries in business and life have become increasingly frequent, and international academic speeches are often held between countries. Due to different languages of different countries, a translation device is generally needed to communicate. In order to ensure confidentiality and convenience of the translation content, the translation device is often used with a pair of translation bluetooth headsets. Each of two parties in the communication wears a bluetooth headset. Each headset can collect voice signals, send the collected voice signals to a translation machine or cloud translation engine for translation, and finally send the translated voice signals to the other headset for playback. Although in most cases this method can achieve effective communication between two parties in different languages, this translation bluetooth headset has certain limitations. Usually, the two parties in communication are face to face and a distance between them is relatively small. For example, a pair of bluetooth headsets include a headset A and a headset B, and two persons in communication includes a person A and a person B, and the person A wears the headset A and the person B wears the headset B; when the person A is speaking, due to a close distance between the two, both of the headset A and the headset B can collect an audio signal of the person A. Since the translation machine or cloud translation engine cannot identify whether the audio signal is from the person A or the person B, the translation machine or cloud translation engine will recognize and translate any audio signal from the headset A and the headset B, that is, the translation machine or cloud translation engine will recognize and translate both the audio signal of the person A collected from the headset A and the audio signal of the person A collected from the headset B. Similarly, when only the person B is speaking, this situation will also occur, which can easily cause confusion in recognition and translation of the translation machine or cloud translation engine, resulting in inaccurate recognition and translation, affecting normal communication and exchanges, and also increase a large amount of unnecessary translation work, resulting in a waste of translation traffic resources.

SUMMARY

An object of the present invention is to provide a bluetooth headset-based voice translation system to overcome defects and shortcomings of the related art. The system can identify a source of audio signals collected by two bluetooth headsets from which party of two parties in communication, and only send audio signals from a person wearing the headset to a translation machine or a cloud translation engine for voice recognition and translation. This solves confusion of voice recognition and translation, thereby making communication more effective; meanwhile, unnecessary voice recognition and translation are greatly reduced.

In order to achieve the above object, the present invention provides a bluetooth headset-based voice translation system, including:

- a first translation bluetooth headset and a second translation bluetooth headset; wherein the first translation bluetooth headset and the second translation bluetooth headset are respectively worn on users who communicate with each other;
- an audio signal processing center; wherein the audio signal processing center includes a Fourier-transform module, a signal cross-correlation processing module, a judgment module, and a gain module; a first audio signal collected by the first translation bluetooth headset and a second audio signal collected by the second translation bluetooth headset are sent to the Fourier-transform module for time-frequency signal processing; and the first audio signal and the second audio signal are subjected to signal cross-correlation processing by the signal cross-correlation processing module; and according to a size of a signal cross-correlation value of the first audio signal and the second audio signal, the judgment module judges whether the first audio signal and the second audio signal are from a same sound source; when the first audio signal and the second audio signal are from the same sound source, a sound source position is determined according to a time delay relationship between the first audio signal and the second audio signal; the gain module sets a gain factor G1 of the first audio signal and a gain factor G2 of the second audio signal according to obtained sound source position information;
- a translation module; wherein after the first audio signal and the second audio signal are processed by the gain module, the translation module recognizes and translates the first audio signal and the second audio signal, and sends translated audio signals to the first translation bluetooth headset or the second translation bluetooth headset accordingly.

According to one embodiment of the present invention, when the signal cross-correlation value of the first audio signal and the second audio signal is (0.7, 1), the first audio signal and the second audio signal are signals from the same sound source.

According to one embodiment of the present invention, when the first audio signal and the second audio signal are both from the user who wears the first translation bluetooth headset, the first gain factor G1 is set to 1, and the second gain factor G2 is set to 0; when the first audio signal and the second audio signal are both from the user who wears the second translation bluetooth headset, the first gain factor G1 is set to 0, and the second gain factor G2 is set to 1.

According to one embodiment of the present invention, the audio signal processing center further includes a signal amplitude detection module configured to detect signal amplitudes of the first audio signal and the second audio signal; when the first audio signal and the second audio signal are from the same sound source, if the signal amplitude of the first audio signal is greater than the signal amplitude of the second audio signal, the first audio signal and the second audio signal are both from the user who wears the first translation bluetooth headset; otherwise, the first audio signal and the second audio signal are both from the user who wears the second translation bluetooth headset.

An object of the present invention is to provide a bluetooth headset-based voice translation method including: firstly performing Fourier transformation on the first audio signal and the second audio signal which are respectively collected by the first translation bluetooth headset and the second translation bluetooth headset, to perform time-frequency signal processing; then, performing signal cross-correlation processing on the first audio signal and the second audio signal that have undergone the time-frequency signal processing, thereby obtaining a signal cross-correlation value of the first audio signal and the second audio signal, and judging whether the first audio signal and the second audio signal are from a same sound source according to the size of the signal cross-correlation value; when the first audio signal and the second audio signal are from the same sound source, determining a sound source position according to a time delay relationship between the first audio signal and the second audio signal; setting a gain factor G1 of the first audio signal and a gain factor G2 of the second audio signal according to sound source position information; finally, performing gain operation on the first audio signal and the second audio signal, and transmitting the first audio signal and the second audio signal that have undergone the gain operation to a translation machine or a cloud translation engine for recognition and translation, and sending translated audio signals to the first translation bluetooth headset or the second translation bluetooth headset accordingly.

According to one embodiment of the present invention, the judging whether the first audio signal and the second audio signal are from the same sound source, includes:

expressing a cross-correlation function of the first audio signal and the second audio signal with the following formulas:

$$R_{x_1x_2}(\tau) = E[x_1(t)\cdot x_2(t-\tau)] \quad (1)$$

wherein $x_1(t)$ represents a signal propagation model of the first audio signal, $x_2(t)$ represents a signal propagation model of the second audio signal;

$$x_1(t) = \alpha * s(t-\tau_1) + n_1(t) \quad (2)$$

$$x_2(t) = \beta * s(t-\tau_2) + n_2(t) \quad (3)$$

wherein t represents time; s(●) represents a sound source model; $n_1$(●) and $n_2$(●) represent noise models; $x_1$(●) and $x_2$ represent signal models received at the first translation bluetooth headset and the second translation bluetooth headset respectively; $\tau_1$ and $\tau_2$ represent time when a sound source propagates to the first translation bluetooth headset and the second translation bluetooth headset, respectively; $\alpha$ and $\beta$ represent energy attenuation factors when the sound source propagates to the first translation bluetooth headset and the second translation bluetooth headset, respectively; and $\tau$ represents signal propagation delay;

in case that noise signals are uncorrelated with a voice signal and the noise signals are uncorrelated with each other, changing the cross-correlation function of the first audio signal and the second audio signal as:

$$R_{x_1x_2}(\tau) = \alpha\beta E[s(t-\tau_1)\cdot s(t-\tau_2)] \quad (4)$$

calculating a value of $R_{x_1x_2}(\tau)$ according to the formula (4); when the value of $R_{x_1x_2}(\tau)$ is (0.7, 1), judging that the first audio signal and the second audio signal are from the same sound source.

According to one embodiment of the present invention, the sound source position is determined according to the time delay relationship between the first audio signal and the second audio signal:

the formula (4) is transformed into:

$$R_{x_1x_2}(\tau) = \alpha\beta R_{ss}(\tau_1-\tau_2) \quad (4)$$

according to characteristics of the correlation function, $R_{ss}(\tau_1-\tau_2)\leq R_{ss}(0)$, and the time delay between the first audio signal and the second audio signal is calculated as $\tau=\tau_1-\tau_2$; when the time delay $\tau$ is positive, indicating that the first audio signal and the second audio signal are both from the user who wears the second translation bluetooth headset; on the contrary, when the time delay $\tau$ is negative, indicating that the first audio signal and the second audio signal are both from the user who wears the first translation bluetooth headset.

Compared with the related art, the present invention has the following beneficial effects. According to the bluetooth headset-based voice translation system and method provided in the present invention, the system can identify whether the first audio signal and the second audio signal are signals from the same sound source, and determine which sound source the first audio signal and the second audio signal from the same sound source signal are from, thereby setting corresponding gain factors for the first audio signal and the second audio signal, that is, when the first audio signal and the second audio signal are both from the user who wears the first translation bluetooth headset, the first gain factor G1=1, and the second gain factor G2=0; when the first audio signal and the second audio signal are both from the user who wears the second translation bluetooth headset, the first gain factor G1=0, and the second gain factor G2=1. The first audio signal and the second audio signal that have undergone gain operation are transmitted to the translation machine or the cloud translation engine for recognition and translation. In this way, the confusion of recognition and translation is solved, thereby making communication more effective; meanwhile, unnecessary voice recognition and translation are greatly reduced.

DETAILED DESCRIPTION OF PREFERRED EMBODIMENTS

The technical solutions of the present invention will be described hereinafter in conjunction with embodiments of the present invention.

Figure 1:
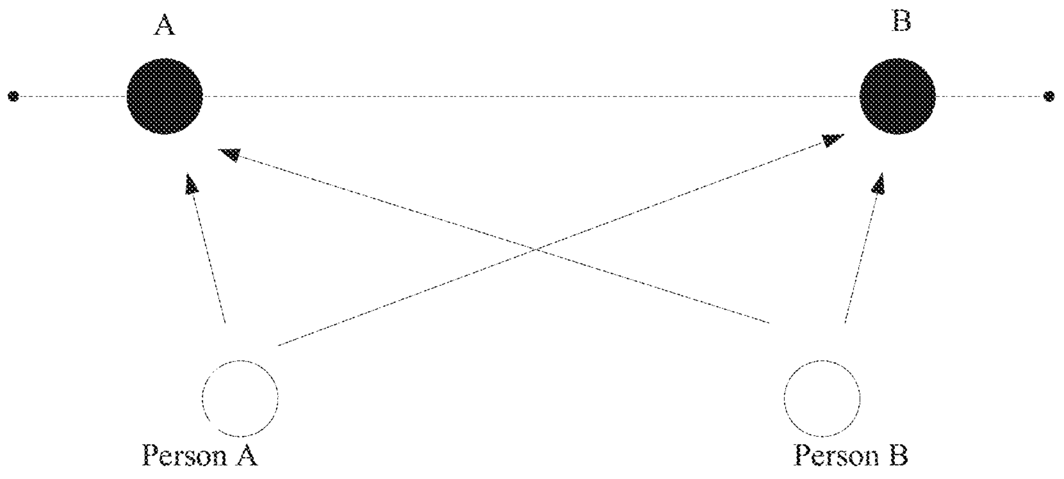
FIG. 1 is a schematic diagram of an application scenario model according to an embodiment of the present invention.
Figure 2:
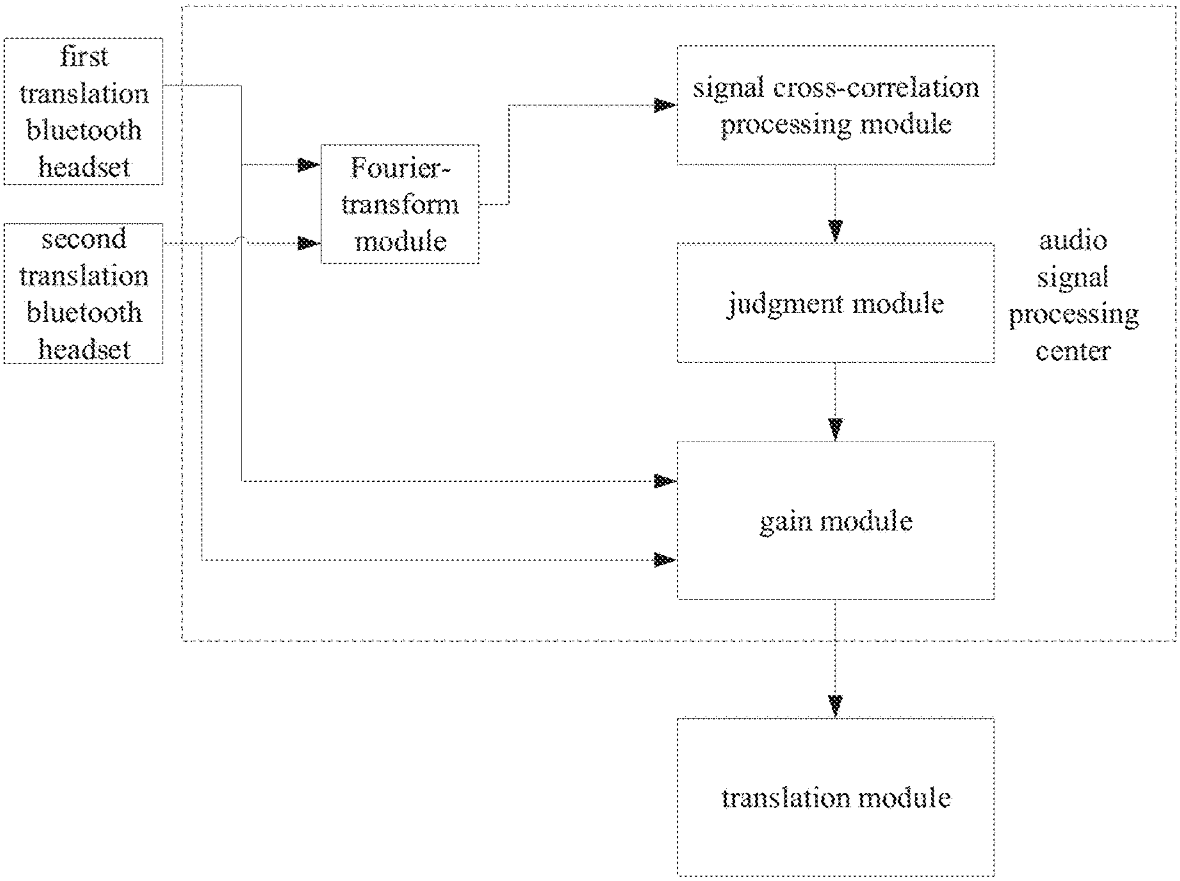
FIG. 2 is a schematic block diagram of a bluetooth headset-based voice translation system according to the present invention.
Figure 3:
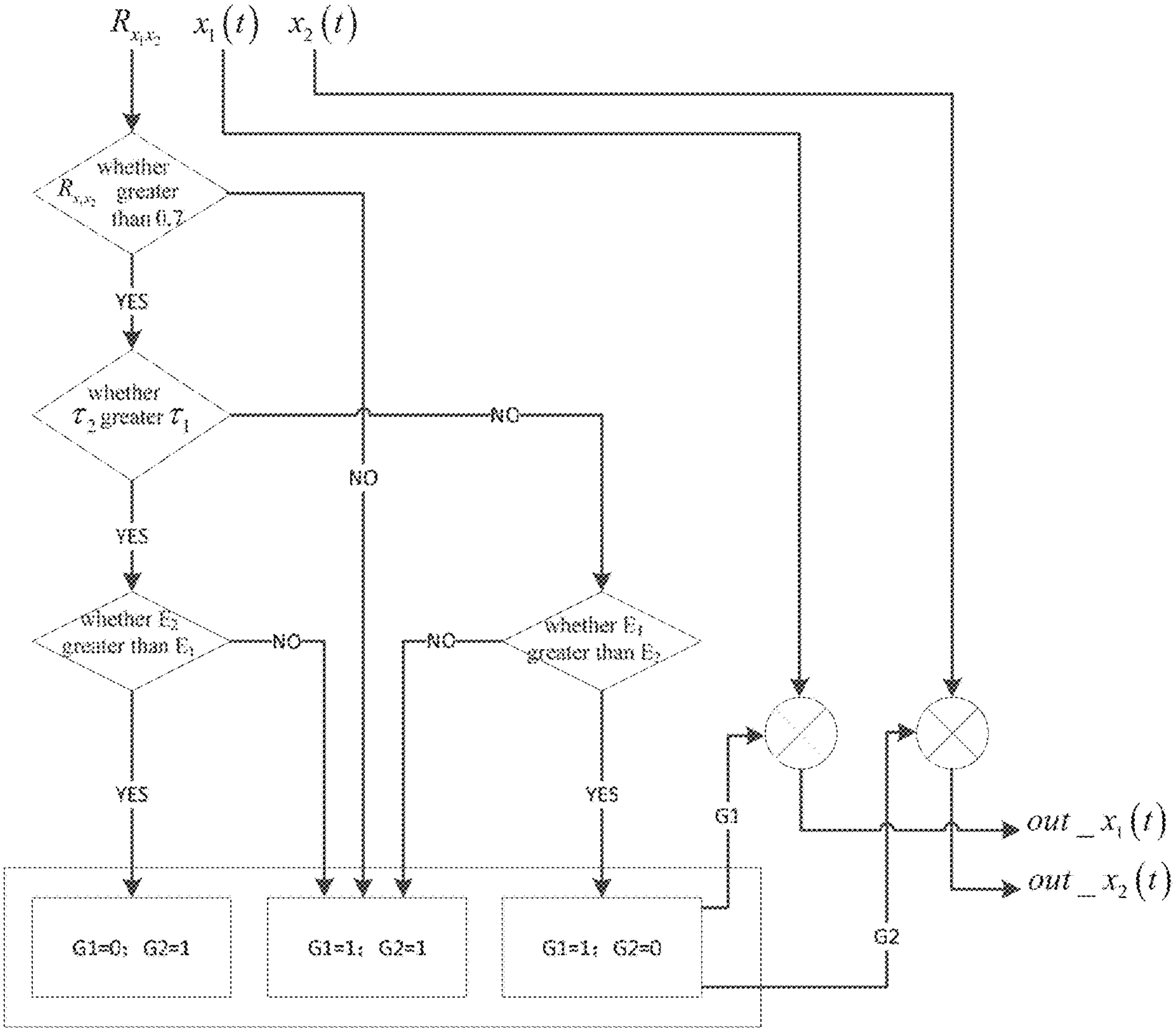
FIG. 3 is a flow chart of a bluetooth headset-based voice translation method according to the present invention.

As shown in FIG. 1, which is a schematic diagram of an application scenario model of the present invention, a pair of bluetooth headsets usually have two: left one and right one, and the left and right bluetooth headsets are worn on two persons who communicate with each other. For example, a pair of translation bluetooth headsets include a first translation bluetooth headset (i.e., the left bluetooth headset) and a second translation bluetooth headset (i.e., the right bluetooth headset). After the two headsets are worn, the first translation bluetooth headset is located at a position A and the second translation bluetooth headset is located at a position B. The two persons in communication include a person A and a person B, and the person A wears the first translation bluetooth headset and the person B wears the second translation bluetooth headset. The content of the present invention is described hereinafter in detail with this scenario model. As shown in FIG. 2, which is a schematic block diagram of a bluetooth headset-based voice translation system of the present invention, the system includes a first translation bluetooth headset and a second translation bluetooth headset. The first translation bluetooth headset and the second translation bluetooth headset are worn on users who communicate with each other. In one embodiment of the present invention, the first translation bluetooth headset and the second translation bluetooth headset can be the left and right ones of a pair of bluetooth headsets, or can be two unpaired wireless bluetooth headsets.

The voice translation system of the present invention further includes an audio signal processing center, and also includes a storage module, a processor, a power module, etc. for realizing functions of the translation system. The audio signal processing center is a core of signal processing, and mainly includes a Fourier-transform module, a signal cross-correlation processing module, a judgment module, and a gain module. A signal collected by the first translation bluetooth headset is a first audio signal, and a signal collected by the second translation bluetooth headset is a second audio signal. The first audio signal and the second audio signal are sent to the Fourier-transform module for time-frequency signal processing, and then the first audio signal and the second audio signal are subjected to signal cross-correlation processing by the signal cross-correlation processing module, thereby obtaining a signal cross-correlation value; and according to a size of the signal cross-correlation value, the judgment module judges whether the first audio signal and the second audio signal are from a same sound source. When it is judged that the first audio signal and the second audio signal are from the same sound source, a sound source position is determined according to a time delay relationship between the first audio signal and the second audio signal. When it is judged that the first audio signal and the second audio signal are not from the same sound source, the audio signal processing center does not process the two audio signals, and only maintains original signal collection function. The gain module sets a gain factor G1 of the first audio signal and a gain factor G2 of the second audio signal according to the obtained sound source position information.

In the embodiment of the present invention, the voice translation system further includes a translation module. After the first audio signal and the second audio signal are processed by the gain module, the translation module recognizes and translates the first audio signal and the second audio signal, and sends the translated audio signals to the first translation bluetooth headset or the second translation bluetooth headset accordingly. That is, the first audio signal collected by the first translation bluetooth headset, after recognition and translation, is sent to the second translation bluetooth headset for playback; the second audio signal collected by the second translation bluetooth headset, after recognition and translation is sent to the first translation bluetooth headset for playback. In this way, accurate voice translation is achieved, and translation errors and confusion are avoided.

In one embodiment of the present invention, whether the first audio signal and the second audio signal are signals from the same sound source is judged according to the size of the signal cross-correlation value of the first audio signal and the second audio signal. When the signal cross-correlation value of the first audio signal and the second audio signal is (0.7, 1), it can be judged that the first audio signal and the second audio signal are signals from the same sound source; otherwise, the first audio signal and the second audio signal are not signals from the same sound source.

In one embodiment of the present invention, when the first audio signal and the second audio signal are signals from the same sound source, a next step of signal processing is required. For example, when the first audio signal and the second audio signal are both from the user who wears the first translation bluetooth headset, the first gain factor G1 is set to 1, and the second gain factor G2 is set to 0; when the first audio signal and the second audio signal are both from the user who wears the second translation bluetooth headset, the first gain factor G1 is set to 0, and the second gain factor G2 is set to 1. The purpose of setting the gain factor in this way is to obtain a required target voice signal for accurate recognition and translation.

In one embodiment of the present invention, the audio signal processing center further includes a signal amplitude detection module for detecting signal amplitudes of the first audio signal and the second audio signal. When the first audio signal and the second audio signal are from the same sound source, if the signal amplitude of the first audio signal is greater than the signal amplitude of the second audio signal, the first audio signal and the second audio signal are both from the user who wears the first translation bluetooth headset; otherwise, the first audio signal and the second audio signal are both from the user who wears the second translation bluetooth headset.

Another object of the present invention is to provide a bluetooth headset-based voice translation method. The method includes the following steps: firstly performing Fourier transformation on a first audio signal and a second audio signal which are respectively collected by a first translation bluetooth headset and a second translation bluetooth headset, to perform time-frequency signal processing; then, performing signal cross-correlation processing on the first audio signal and the second audio signal that have undergone the time-frequency signal processing, thereby obtaining a signal cross-correlation value of the first audio signal and the second audio signal, and judging whether the first audio signal and the second audio signal are from a same sound source according to the size of the signal cross-correlation value; when the first audio signal and the second audio signal are from the same sound source, determining a sound source position according to a time delay relationship between the first audio signal and the second audio signal; setting a gain factor G1 of the first audio signal and a gain factor G2 of the second audio signal according to sound source position information; finally, performing gain operation on the first audio signal and the second audio signal, and transmitting the first audio signal and the second audio signal to the translation machine or the cloud translation engine for recognition and translation, and sending translated audio signals to the first translation bluetooth headset or the second translation bluetooth headset accordingly.

In one embodiment of the present invention, judging whether the first audio signal and the second audio signal are from the same sound source, includes:

expressing a cross-correlation function of the first audio signal and the second audio signal with the following formulas:

$$R_{x_1x_2}(\tau) = E[x_1(t)\cdot x_2(t-\tau)] \quad (1)$$

where $x_1(t)$ represents a signal propagation model of the first audio signal, $x_2(t)$ represents a signal propagation model of the second audio signal;

$$x_1(t) = \alpha * s(t-\tau_1) + n_1(t) \quad (2)$$

$$x_2(t) = \beta * s(t-\tau_2) + n_2(t) \quad (3)$$

where t represents time; s(●) represents a sound source model; $n_1$(●) and $n_2$(●) represent noise models; $x_1$(●) and $x_2$(●) represent signal models received at the first translation bluetooth headset and the second translation bluetooth headset respectively; $\tau_1$ and $\tau_2$ represent time when a sound source propagates to the first translation bluetooth headset and the second translation bluetooth headset, respectively; α and β represent energy attenuation factors when the sound source propagates to the first translation bluetooth headset and the second translation bluetooth headset, respectively; and T represents signal propagation delay;

in case that noise signals are uncorrelated with the voice signal and the noise signals are uncorrelated with each other, changing the cross-correlation function of the first audio signal and the second audio signal as:

$$R_{x_1x_2}(\tau) = \alpha\beta E[s(t-\tau_1)\cdot s(t-\tau_2)] \quad (4)$$

calculating a value of $R_{x_1x_2}(\tau)$ according to the formula (4); when the value of $R_{x_1x_2}(\tau)$ is (0.7, 1), judging that the first audio signal and the second audio signal are from the same sound source. In the embodiment of the present invention, when the value of $R_{x_1x_2}(\tau)$ is (0, 0.7), it indicates that the first audio signal and the second audio signal are not from the same sound source; at this point, it is only necessary to save the first audio signal and the second audio signal without identifying and translating them.

In one embodiment of the present invention, when the first audio signal and the second audio signal are both from the same sound source, the sound source position can be determined according to the time delay relationship between the first audio signal and the second audio signal. Then the formula (4) is transformed into:

$$R_{x_1x_2}(\tau) = \alpha\beta R_{ss}(\tau_1-\tau_2) \quad (4)$$

According to characteristics of the correlation function, $R_{ss}(\tau_1-\tau_2) \le R_{ss}(0)$, thus, the time delay between the first audio signal and the second audio signal can be calculated as $\tau=\tau_1-\tau_2$. When the time delay τ is positive, it indicates that the first audio signal and the second audio signal are both from the user who wears the second translation bluetooth headset. On the contrary, when the time delay τ is negative, it indicates that the first audio signal and the second audio signal are both from the user who wears the first translation bluetooth headset. In one embodiment of the present invention, the position of the signal source can also be determined based on amplitudes or strengths of collected signals, that is, $$\sum_{n=0}^{N} E_1(n) \ge \sum_{n=0}^{N} E_2(n),$$

where $E_1(*)$ represent energy of a signal $x_1$, and $E_2(*)$ represent energy of a signal $x_2$, it indicates that the first audio signal and the second audio signal are both from the user who wears the first translation bluetooth headset; on the contrary, $$\sum_{n=0}^{N} E_2(n) \ge \sum_{n=0}^{N} E_1(n),$$

it indicates that the first audio signal and the second audio signal are both from the user who wears the second translation bluetooth headset.

In summary, according to the bluetooth headset-based voice translation system and method provided in the present invention, the system can identify whether the first audio signal and the second audio signal are signals from the same sound source, and determine which sound source the first audio signal and the second audio signal from the same sound source signal are from, thereby setting corresponding gain factors for the first audio signal and the second audio signal, that is, when the first audio signal and the second audio signal are both from the user who wears the first translation bluetooth headset, the first gain factor G1=1, and the second gain factor G2=0; when the first audio signal and the second audio signal are both from the user who wears the second translation bluetooth headset, the first gain factor G1=0, and the second gain factor G2=1. The first audio signal and the second audio signal that have undergone gain operation are transmitted to the translation machine or the cloud translation engine for recognition and translation. In this way, the confusion of recognition and translation is solved, thereby making communication more effective; meanwhile, unnecessary voice recognition and translation are greatly reduced.

The preferred embodiments of the present invention are described in details above, but the present invention is not limited to the above embodiments. Various changes can be made within the knowledge scope of ordinary technicians in this field without departing from the purpose of the present invention.

What is claimed is:

1. A bluetooth headset-based voice translation system, comprising:

a first translation bluetooth headset and a second translation bluetooth headset; wherein the first translation bluetooth headset and the second translation bluetooth headset are respectively worn on users who communicate with each other;

an audio signal processing center; wherein the audio signal processing center includes a Fourier-transform module, a signal cross-correlation processing module, a judgment module, and a gain module; the first translation bluetooth headset is configured to send a first audio signal collected by the first translation bluetooth headset to the Fourier-transform module; and the second translation bluetooth headset is configured to send a second audio signal collected by the second translation bluetooth headset to the Fourier-transform module; the Fourier-transform module is configured to perform time-frequency signal processing on the first audio signal and the second audio signal; and the signal cross-correlation processing module is configured to perform signal cross-correlation processing on the first audio signal and the second audio signal; and the judgment module is configured to, according to a size of a signal cross-correlation value of the first audio signal and the second audio signal, judge whether the first audio signal and the second audio signal are from a same sound source; the judgment module is further configured to, when the first audio signal and the second audio signal are from the same sound source, determine a sound source position; the gain module is configured to set a gain factor G1 of the first audio signal and a gain factor G2 of the second audio signal according to obtained sound source position information; and a translation module configured to recognize and translate the first audio signal and the second audio signal that have been processed by the gain module, and send translated audio signals to the first translation bluetooth headset or the second translation bluetooth headset accordingly;

wherein the judgment module is further configured to, when the signal cross-correlation value of the first audio signal and the second audio signal is (0.7, 1), determine that the first audio signal and the second audio signal are signals from the same sound source.

2. The system according to claim 1, wherein the gain module is further configured to, when the first audio signal and the second audio signal are both from the user who wears the first translation bluetooth headset, set the first gain factor G1 to 1, and set the second gain factor G2 to 0; when the first audio signal and the second audio signal are both from the user who wears the second translation bluetooth headset, set the first gain factor G1 to 0, and set the second gain factor G2 to 1.

3. The system according to claim 1, wherein the audio signal processing center further includes a signal amplitude detection module configured to detect signal amplitudes of the first audio signal and the second audio signal;

the judgment module is further configured to, when the first audio signal and the second audio signal are from the same sound source, if the signal amplitude of the first audio signal is greater than the signal amplitude of the second audio signal, determine that the first audio signal and the second audio signal are both from the user who wears the first translation bluetooth headset; otherwise, determine that the first audio signal and the second audio signal are both from the user who wears the second translation bluetooth headset.

4. The system according to claim 1, wherein the judgment module is further configured to, when the first audio signal and the second audio signal are from the same sound source, determine the sound source position according to a time delay relationship between the first audio signal and the second audio signal.

5. A bluetooth headset-based voice translation method for the bluetooth headset-based voice translation system according to claim 1, comprising:

performing Fourier transformation on the first audio signal and the second audio signal which are respectively collected by the first translation bluetooth headset and the second translation bluetooth headset, to perform time-frequency signal processing;

performing signal cross-correlation processing on the first audio signal and the second audio signal that have undergone the time-frequency signal processing, thereby obtaining a signal cross-correlation value of the first audio signal and the second audio signal, and judging whether the first audio signal and the second audio signal are from a same sound source according to the size of the signal cross-correlation value;

when the first audio signal and the second audio signal are from the same sound source, determining a sound source position; setting a gain factor G1 of the first audio signal and a gain factor G2 of the second audio signal according to sound source position information;

performing gain operation on the first audio signal and the second audio signal, and transmitting the first audio signal and the second audio signal that have undergone the gain operation to a translation machine or a cloud translation engine for recognition and translation, and sending translated audio signals to the first translation bluetooth headset or the second translation bluetooth headset accordingly.

6. The method according to claim 5, wherein the judging whether the first audio signal and the second audio signal are from the same sound source, includes:

expressing a cross-correlation function of the first audio signal and the second audio signal with the following formulas:

$$R_{x_1x_2}(\tau) = E[x_1(t)\cdot x_2(t-\tau)] \tag{1}$$

wherein $x_1(t)$ represents a signal propagation model of the first audio signal, $x_2(t)$ represents a signal propagation model of the second audio signal;

$$x_1(t) = \alpha * s(t-\tau_1) + n_1(t) \tag{2}$$

$$x_2(t) = \beta * s(t-\tau_2) + n_2(t) \tag{3}$$

wherein t represents time; s(●) represents a sound source model; $n_1$(●) and $n_2$(●) represent noise models; $x_1$(●) and $x_2$(●) represent signal models received at the first translation bluetooth headset and the second translation bluetooth headset respectively; $\tau_1$ and $\tau_2$ represent time when a sound source propagates to the first translation bluetooth headset and the second translation bluetooth headset, respectively; $\alpha$ and $\beta$ represent energy attenuation factors when the sound source propagates to the first translation bluetooth headset and the second translation bluetooth headset, respectively; and $\tau$ represents signal propagation delay;

in case that noise signals are uncorrelated with a voice signal and the noise signals are uncorrelated with each other, changing the cross-correlation function of the first audio signal and the second audio signal as:

$$R_{x_1x_2}(\tau)=\alpha\beta E[s(t-\tau_1)\cdot s(t-\tau_2)] \quad (4)$$

calculating a value of $R_{x_1x_2}(\tau)$ according to the formula (4); when the value of $R_{x_1x_2}(\tau)$ is (0.7, 1), judging that the first audio signal and the second audio signal are from the same sound source.

7. The method according to claim 6, wherein the sound source position is determined according to a time delay relationship between the first audio signal and the second audio signal in a manner including:

transforming the formula (4) into:

$$R_{x_1x_2}(\tau)=\alpha\beta R_{ss}(\tau_1-\tau_2) \quad (4)$$

obtaining $R_{ss}(\tau_1-\tau_2)\leq R_{ss}(0)$ according to characteristics of the correlation function, and calculating the time delay between the first audio signal and the second audio signal as $\tau=\tau_1-\tau_2$; when the time delay $\tau$ is positive, determining that the first audio signal and the second audio signal are both from the user who wears the second translation bluetooth headset; on the contrary, when the time delay T is negative, determining that the first audio signal and the second audio signal are both from the user who wears the first translation bluetooth headset.

8. The method according to claim 5, wherein the judging whether the first audio signal and the second audio signal are from a same sound source according to the size of the signal cross-correlation value, includes:

when the signal cross-correlation value of the first audio signal and the second audio signal is (0.7, 1), determining that the first audio signal and the second audio signal are signals from the same sound source.

9. The method according to claim 5, wherein the setting a gain factor G1 of the first audio signal and a gain factor G2 of the second audio signal according to sound source position information, includes:

when the first audio signal and the second audio signal are both from the user who wears the first translation bluetooth headset, setting the first gain factor G1 to 1, and setting the second gain factor G2 to 0; when the first audio signal and the second audio signal are both from the user who wears the second translation bluetooth headset, setting the first gain factor G1 to 0, and setting the second gain factor G2 to 1.

10. The method according to claim 5, wherein the determining a sound source position, includes:

when the first audio signal and the second audio signal are from the same sound source, determining the sound source position according to a time delay relationship between the first audio signal and the second audio signal.

11. A bluetooth headset-based voice translation system, comprising:

a first translation bluetooth headset and a second translation bluetooth headset; wherein the first translation bluetooth headset and the second translation bluetooth headset are respectively worn on users who communicate with each other;

an audio signal processing center; wherein the audio signal processing center includes a Fourier-transform module, a signal cross-correlation processing module, a judgment module, and a gain module; the first translation bluetooth headset is configured to send a first audio signal collected by the first translation bluetooth headset to the Fourier-transform module; and the second translation bluetooth headset is configured to send a second audio signal collected by the second translation bluetooth headset to the Fourier-transform module; the Fourier-transform module is configured to perform time-frequency signal processing on the first audio signal and the second audio signal; and the signal cross-correlation processing module is configured to perform signal cross-correlation processing on the first audio signal and the second audio signal; and the judgment module is configured to, according to a size of a signal cross-correlation value of the first audio signal and the second audio signal, judge whether the first audio signal and the second audio signal are from a same sound source; the judgment module is further configured to, when the first audio signal and the second audio signal are from the same sound source, determine a sound source position; the gain module is configured to set a gain factor G1 of the first audio signal and a gain factor G2 of the second audio signal according to obtained sound source position information; and a translation module configured to recognize and translate the first audio signal and the second audio signal that have been processed by the gain module, and send translated audio signals to the first translation bluetooth headset or the second translation bluetooth headset accordingly;

wherein the gain module is further configured to, when the first audio signal and the second audio signal are both from the user who wears the first translation bluetooth headset, set the first gain factor G1 to 1, and set the second gain factor G2 to 0; when the first audio signal and the second audio signal are both from the user who wears the second translation bluetooth headset, set the first gain factor G1 to 0, and set the second gain factor G2 to 1.

12. A bluetooth headset-based voice translation system, comprising:

a first translation bluetooth headset and a second translation bluetooth headset; wherein the first translation bluetooth headset and the second translation bluetooth headset are respectively worn on users who communicate with each other;

an audio signal processing center; wherein the audio signal processing center includes a Fourier-transform module, a signal cross-correlation processing module, a judgment module, and a gain module; the first translation bluetooth headset is configured to send a first audio signal collected by the first translation bluetooth headset to the Fourier-transform module; and the second translation bluetooth headset is configured to send a second audio signal collected by the second translation bluetooth headset to the Fourier-transform module; the Fourier-transform module is configured to perform time-frequency signal processing on the first audio signal and the second audio signal; and the signal cross-correlation processing module is configured to perform signal cross-correlation processing on the first audio signal and the second audio signal; and the judgment module is configured to, according to a size of a signal cross-correlation value of the first audio signal and the second audio signal, judge whether the first audio signal and the second audio signal are from a same sound source; the judgment module is further configured to, when the first audio signal and the second audio signal are from the same sound source, determine a sound source position; the gain module is configured to set a gain factor G1 of the first audio signal and a gain factor G2 of the second audio signal according to obtained sound source position information; and a translation module configured to recognize and translate the first audio signal and the second audio signal that have been processed by the gain module, and send translated audio signals to the first translation bluetooth headset or the second translation bluetooth headset accordingly;

wherein the judgment module is further configured to, when the first audio signal and the second audio signal are from the same sound source, determine the sound source position according to a time delay relationship between the first audio signal and the second audio signal.

* * * * *